United States Patent Office 3,428,013
Patented Feb. 18, 1969

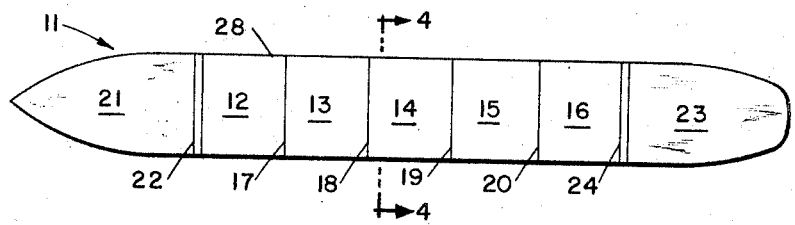
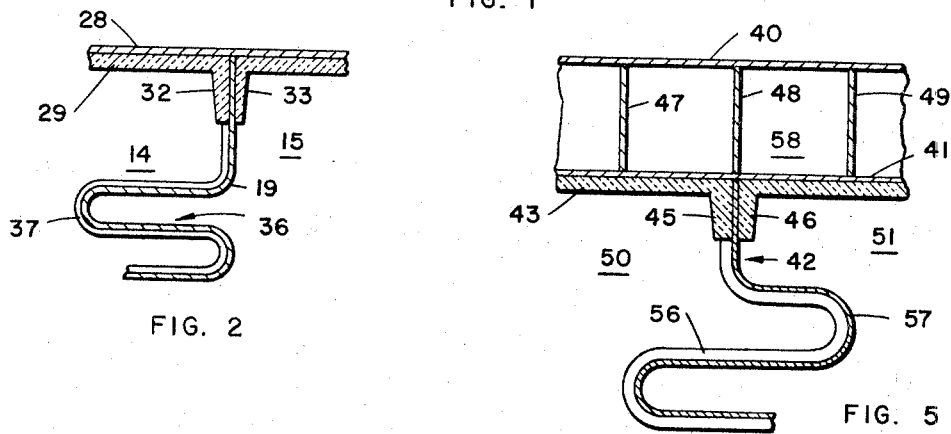
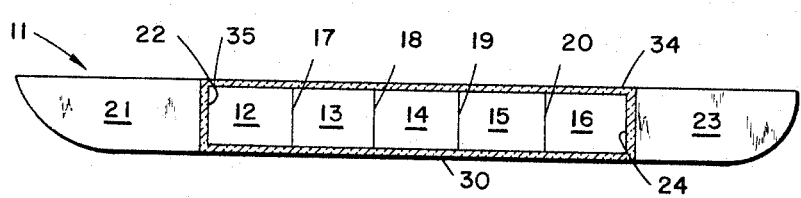
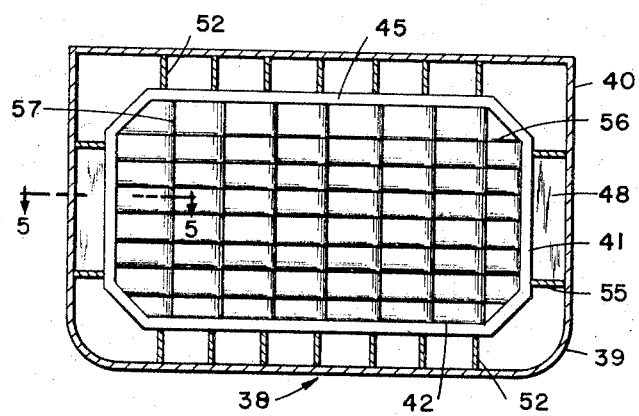

3,428,013
APPARATUS FOR TRANSPORTING LIQUEFIED GASES
Lionel R. Prew, Edison, N.J., assignor to Shell Oil Company, New York, N.Y., a corporation of Delaware
Filed Nov. 3, 1967, Ser. No. 680,538
U.S. Cl. 114—74                    7 Claims
Int. Cl. B63b 25/12

ABSTRACT OF THE DISCLOSURE

Apparatus for transporting liquefied gases over a body of water in the form of a vessel having a plurality of adjoining compartments adapted to carry liquefied gases therein. The lateral and bottom walls of the compartments are formed by the shell of the vessel and are internally lined with a heat insulating material. The tops of the compartments are formed by the deck of the vessel and are also internally insulated. The lateral wall separating the successive compartments is formed by a transverse bulkhead of the vessel having a plurality of vertically and horizontally extending undulations and has a stress condition substantially unaffected by changes in temperature of the liquefied gases carried in the compartments. This separation wall may be lined with heat-insulating material at the junction of the separation wall and the inner surfaces of the vessel, if desired.

BACKGROUND OF THE INVENTION

Field of the invention

The present invention relates to a vessel for transporting liquefied gases over a body of water. In particular, the present invention relates to a tanker suitable for transporting liquefied gases at atmospheric or slightly superatmospheric pressure and at a temperature below 0° C.

Description of the prior art

Various constructions of tankers suitable for the above purpose are already known. These prior art vessels use heat-insulating materials which line all of the walls of the tanks storing the liquefied cold gas with the object of keeping the loss of cold from the liquid gas as low as possible in order to minimize vaporization thereof. A further object of the use of heat-insulating material is to prevent the cooling of vital parts of the ship to subzero temperatures as these parts cannot withstand such temperatures without losing their ductility and reducing their ability to withstand structural stresses.

However, since such prior art vessels require the heat insulation of all the walls of the tanks, the volume of the payload of the vessel is decreased.

Summary of the invention

It is an object of this invention to provide a vessel for carrying liquefied cold gases, in which only a portion of the walls of the compartments of the vessel is covered with heat-insulating material, thereby increasing the volume of payload of the vessel without decreasing the thermal efficiency thereof.

According to the invention, the apparatus for transporting liquefied gases over a body of water comprises a vessel having a plurality of adjoining compartments adapted to carry liquefied gases therein. The lateral walls and bottom forming the compartments are formed by the shell of the vessel and are internally lined with heat-insulating material. The tops of the compartments are formed by the deck of the vessel and are also internally insulated. The lateral wall separating the successive compartments is formed by a transverse bulkhead of the vessel having a plurality of vertically and horizontally extending undulations and has a stress condition substantially unaffected by changes in temperature. In a preferred embodiment, this separation wall is lined with a heat-insulating material only at the junction of the separation wall and the inner surface of the vessel.

The lateral walls of the compartments are those walls which are substantially vertical and substantially parallel to the longitudinal axis of the vessel.

Brief description of the drawing

FIGURE 1 is a sectional plan view of a vessel according to the invention;

FIGURE 2 is a detail of a portion of the vessel of FIGURE 1;

FIGURE 3 is a vertical sectional view of the vessel of FIGURE 1;

FIGURE 4 is a vertical sectional view of a modification of the vessel of FIGURE 1 taken along lines 4—4 of FIGURE 1; and FIGURE 5 is a detail of a portion of the vessel of FIGURE 3 taken along lines 5—5 of FIGURE 4 and similar to that of FIGURE 2.

Description of the preferred embodiments

Referring to FIGURE 1 of the drawing, a vessel or tanker 11 adapted to travel over the surface of a body of water is shown divided into a plurality of compartments 12 through 16 suitable for the storage of cold liquefied gases. Although five such compartments are illustrated, obviously the total number of compartments is a matter of choice depending on the size of the vessel, dimensions of the compartments desired, etc. The compartments 12 through 16 adjoin each other in such a way that each pair of adjoining compartments has a common or separation wall 17 through 20 formed by bulkheads in vessel 11. Compartment 12 is separated from the forecastle 21 of vessel 11 by a bulkhead 22 commonly referred to as a cofferdam whereas compartment 16 is separated from the engine or pump room 23 by a similar cofferdam 24.

The lateral walls of compartments 12 through 16 parallel to the longitudinal axis of vessel 11 are formed by the shell of the vessel 11. This shell may comprise either a single or double shell.

The shell of vessel 11 of FIGURE 1 is shown in FIGURE 2 as comprising a single shell 28 at the junction of wall 19 which is common to both compartments 14 and 15. The inside portion of shell 28 is lined with a lining 29 of heat-insulating material. The portions of the bottom walls of compartments 12 through 16 are formed by the bottom shell or wall 30 of vessel 11 (FIGURE 3) and are also lined with a lining 31 of heat-insulating material.

The bulkhead (FIGURE 2) forming the separation wall 19 between compartments 14 and 15 is connected to the shell 28 of vessel 11 in any suitable manner, as by welding. In order to minimize the loss of cold via bulkhead 19 to shell 28, both sides of bulkhead 19 are lined with strips 32 and 33, respectively, of heat-insulating material over the boundary area where bulkhead 19 contacts shell 28 as seen in FIGURE 2. Strips 32 and 33 preferably form extensions of the lining 29. It will be understood that strips 32 and 33 extend along the entire boundary between the junction of shell 28 with bulkhead 19.

The panels or plates forming the top walls of compartments 12 through 16 are formed by the top wall 34 (FIGURE 3) of vessel 11. Wall 34 is also provided with a suitable heat-insulating lining 35 at least in the region of compartments 12 through 16. Lining 35 is preferably arranged on the inner wall of top wall 34 and preferably merges into the lining 29 arranged on shell 28 of the compartments 12 through 16. Further heat insulating lining strips (not shown) similar to strips 32 and 33 are preferably arranged along the boundary between the junction of bulkhead 19 and its connection to top wall 34. These strips also preferably merge into the linings covering the inner wall of the top wall 34. Top wall 34 of vessel 11 is preferably formed by the deck of vessel 11; however, it may be a separate plate construction if desired.

Some cold may leak away from compartments 12 through 16 to the shell 28. Since this amount forms only a small percentage of the total amount of cold leaking away from compartments 12 through 16, this loss is permissible. It may be advantageous to manufacture the sections of shell 28 which may be subject to low temperatures from a material which does not become too brittle at low temperatures, such as aluminum or low temperature steel.

If desired, the heat insulated strips 32 and 33 arranged on the bulkheads 17 through 20 along the boundary thereof contacting the shell 28 of vessel 11 and/or the roof portion 34 of vessel 11 may be omitted.

Referring once again to FIGURE 2, the bulkhead 19 must be flexible in all directions in the plane of the bulkhead 12 perpendicular to shell 28. This flexibility is obtained by providing bulkhead 19 with both vertical corrugations or undulations 36 and horizontal corrugations or undulations 37. As can be seen, the horizontal corrugations 37 are relatively shallow with respect to vertical corrugations 36. Thus, any expansion or contraction of the material of bulkhead 19 due to temperature changes thereof does not or substantially does not influence the stress conditions of bulkhead 19.

It will be appreciated that bulkhead 19 is made of a material, such as aluminum or low-temperature steel, which does not become brittle at its working temperature, such as a temperature below 0° C. In the foregoing, all comments concerning bulkhead 19 are also deemed pertinent with respect to bulkheads 17, 18 and 20 wherever appropriate.

Referring now to the embodiment of FIGURES 4 and 5, a vessel 38 is shown having a double shell 39. Double shell 39 includes an outer shell 40 and an inner shell 41. A bulkhead 42, corresponding to bulkhead 19 of FIGURES 1 through 3, is connected to inner shell 41 in a suitable manner, such as by welding, and the inner surfaces of inner shell 41 (FIGURE 5) where forming a compartment wall are lined with a heat-insulating lining 43. Comparable heat-insulating linings cover the bottom wall of the compartments of vessel 38 in the manner illustrated in FIGURE 3. Heat-insulating strips 45 and 46 extend all along the periphery of bulkhead 42 in the manner discussed hereinabove with respect to bulkhead 19. The portions of strips 45 and 46 passing along the top or roof portion of vessel 38, which, in the manner of the embodiment of FIGURES 1 through 3 may be the deck of the vessel, merge into a heat-insulating layer (not shown) arranged on the inside of the top or roof portion in the manner discussed hereinabove with references to the top or roof portion 34 of vessel 11.

The shells 40 and 41 are interconnected by horizontal and vertical ring girders or web frames, only those vertical web frames 47 through 49 adjacent compartments 50 and 51 being shown in FIGURE 5 for convenience of illustration. As shown in FIGURE 4, there are further vertical web frames 52 extending between the inner and outer shells 40 and 41 and the deck and bottom of vessel 38. Horizontal web frames 55 are shown in FIGURE 4 extending between the vertically extending portions of shells 40 and 41. It will be appreciated that the present invention is not limited to the arrangement of interconnecting the inner and outer shells and the deck portion of the vessel 38 as shown in the drawing, but that any other type of arrangement for obtaining the required stiffness of the vessel 38 may be used for the purpose.

The arrangement of the horizontal corrugation or undulations 56 and vertical corrugations or undulations 57 on bulkhead 42 is slightly different from those of bulkheads 17 through 20. In FIGURE 5, the plane of bulkhead 42 is perpendicular to the plane of shell 39 and passes through the center of the vertical undulations 57 whereas this plane in the embodiment of FIGURES 1 through 3 passes tangentially to the top of the vertical undulations 36 as can be seen in FIGURE 2. As shown in FIGURE 5, the vertical web frame 48 is shown as lying in the plane of bulkhead 42. Alternately, web frame 48 may form part of bulkhead 42, and the inner shell 41 may be divided into parts which are connected to opposite sides of the flat portion of bulkhead 42 (not shown).

It will be appreciated that the amount of cold passing through the material of bulkhead 42 where arranged between heat-insulating linings 45 and 46 dissipates over the inner shell 41 and the web frame 48 and is prevented from reaching outer shell 40, providing a sufficient amount of fluid, as, for example, air, is circulated through the space 58 lying between the shells 40 and 41. Thus, normal shipbuilding materials such as steel may be used as a material in the manufacture of outer shell 40.

Whereas bulkheads 17 through 20 and 42 are not covered with heat-insulating material over the greater portion thereof, the sides of cofferdams 22 and 24 facing the interior of compartments 12 through 16 (and compartments 50 and 51) are covered with heat-insulating material over the total area thereof. This material contacts or preferably merges into the heat-insulating linings arranged on the inner shell or shells of vessels 11 and 38, as well as the linings applied to the inside portion of deck or top wall 34 which acts as a cover for compartments 12 through 16 (or 50 and 51).

Suitable means for filling and draining the compartments through are further arranged on board the vessels. These means, such as pumps and conduits, are known per se and have not been shown in the drawing for simplicity of illustration. In all of the foregoing, the comments pertaining to vessel 11, bulkheads 17 through 20 and compartments 12 through 16 are deemed applicable to vessel 38, bulkhead 42 and compartments 50 and 51 wherever appropriate.

Since the majority of the materials suitable for constructing the bulkheads will contract or expand as a function of temperature, the corrugations or undulations of the bulkheads must be designed so as to allow for temperature changes of the bulkheads which do not result in a change or in an appreciable change in the stress condition of the bulkheads. The bulkheads may be formed by any one of the various thermally contractible and expansible panels or walls provided with corrugations which are known in the art.

By the expression "corrugation" as used in connection with the shape of the bulkheads, it is also to be understood to include dimples, wrinkles, undulations and all other configurations of a panel or wall which allow an easy contraction and expansion of such panel or wall in all directions in the plane of the panel or wall when said panel or wall is loaded in the plane thereof.

The invention is applicable to ships having a skin or shell consisting either of a single shell or of a double shell. In the latter case, a framework or plate is arranged between the inner and outer shell of the ship's skin and in the plane of the bulkheads.

No particular type of heat-insulating material has been discussed since such materials, as blasa wood or sprayed polyurethane, which can be applied for preventing loss of cold from containers carrying cold liquefied gases are known and may be applied in the foregoing embodiments of the invention.

I claim as my invention:

1. Apparatus for transporting liquefied gases over a body of water comprising:

a vessel having an outer shell forming the sides and bottom of said vessel;

a top deck closing the top of said shell;

a plurality of spaced transverse bulkheads disposed within said shell substantially perpendicular to the longitudinal axis of said vessel below said top deck and connected to both said top deck and said shell so as to form a plurality of successive liquid-tight compartments therein;

the bottom portion of said top deck and the inner surfaces of said shell, at least in the vicinity of said compartments, being provided with heat-insulating material;

the transverse bulkheads between successive compartments being formed of a material having a stress condition substantially unaffected by changes in temperature of the liquefied gases; and the bulkhead between successive compartments including a plurality of vertically and horizontally extending undulations to permit said bulkhead to flex in all directions in the plane of said bulkhead.

2. The apparatus of claim 1 wherein said bulkhead between successive compartments is provided with heat-insulating material only at the junction of said bulkhead with the inner surface of said shell.

3. The apparatus of claim 2 wherein the heat-insulating material on said bulkheads between successive compartments merges into the heat-insulating material on said top deck and said shell.

4. The apparatus of claim 1 wherein said shell is a double shell comprising an inner shell and an outer shell; the transverse bulkheads being arranged between said inner shell; and vertical web frames disposed between said inner and outer shell lying in the same plane as that of said bulkheads.

5. The apparatus of claim 4 wherein said inner shell is formed of a low-temperature material.

6. The apparatus of claim 1 wherein the bulkhead forming the front wall of the foremost compartment and the rear wall of the rear compartment is a cofferdam; and the sides of said cofferdams in engagement with the interior of said compartments being provided with heat-insulating material.

7. The apparatus of claim 6 wherein the heat-insulating material on said cofferdams merges into the heat-insulating material on said top deck and said shell.

References Cited

UNITED STATES PATENTS 3,034,309   5/1962   Muck.
3,085,538   4/1963   Henry.
3,157,147   11/1964   Ludwig.

FOREIGN PATENTS 888,746   2/1962   Great Britain.

TRYGVE M. BLIX, *Primary Examiner.*

U.S. Cl. X.R.

220—15